Aug. 7, 1928.
M. E. MATHIAS
EASEL
1,680,056
Filed Jan. 8, 1926
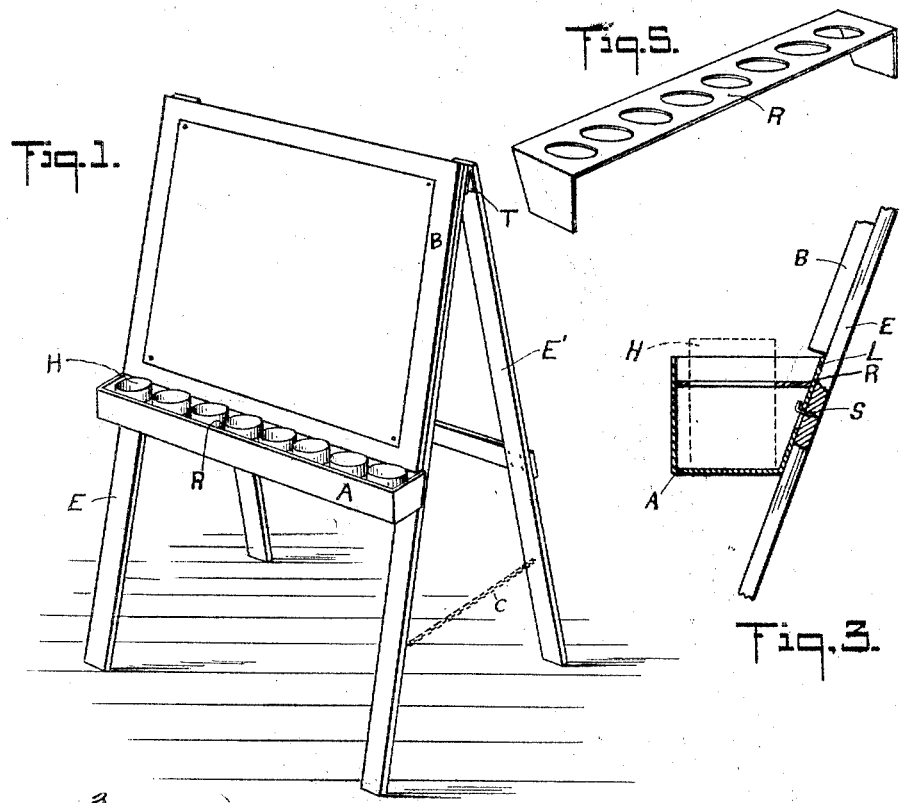
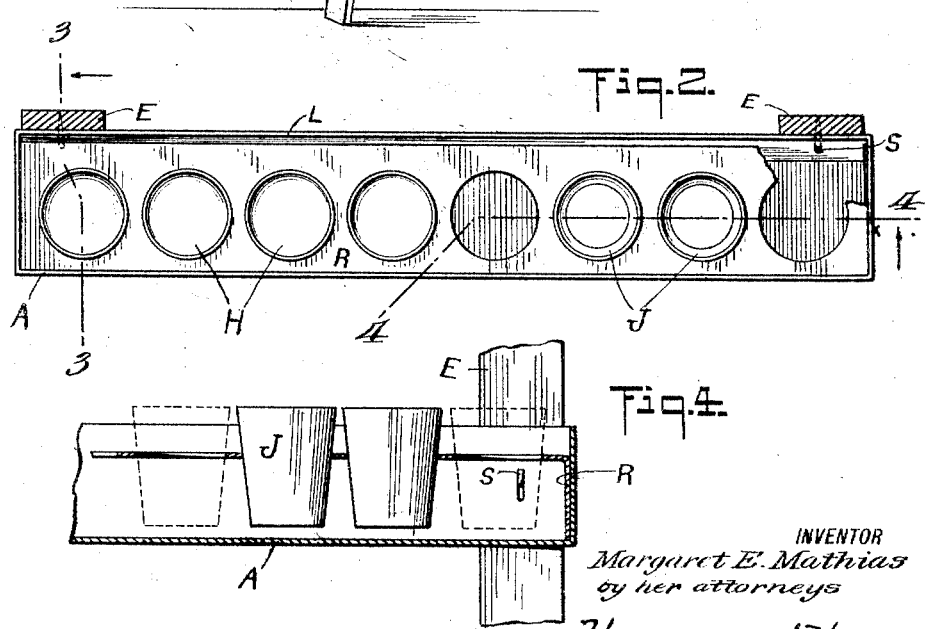
INVENTOR
Margaret E. Mathias
by her attorneys
Howson and Howson Patented Aug. 7, 1928.

1,680,056

UNITED STATES PATENT OFFICE.

MARGARET E. MATHIAS, OF MONTCLAIR, NEW JERSEY.

EASEL.

Application filed January 8, 1926. Serial No. 80,071.

My invention has to do with easels and is well adapted for use by small children. It is particularly useful when a liquid form of paint is employed, but may also be used to advantage with other drawing or painting media.

In teaching painting to children difficulty has been experienced in securing an easel which is adapted at the same time both to promote the child's physical comfort and correct posture and to facilitate his choice of colors according to his individual color preference. The matter of convenience influences the child's use of color. Unless all colors are equally accessible he may use a color because he can reach it easily, rather than because he prefers that particular color.

There has further been the objection to painting lessons for children that the inexperienced youthful painter is unable to prevent drippings from his brush or picture, which prove injurious to clothing, floors and furniture.

The object of my invention is to make all the paints easily and equally accessible to the child as he stands at the easel, thus making possible a more scientific study of children's color preferences.

Another object is to provide a means to catch the drippings, both from the picture on the easel board and from the painting materials, such as brushes and paint holders, thus saving the floor, the neighboring furniture and the children's clothing from injury.

I have endeavored also to provide an easel which will encourage correct posture while the child is painting, and will prevent the child's stooping to reach the paint.

The form in which I prefer to make my easels has another practical advantage, in that they are compact and easy to stack and at the same time eliminate the necessity for a separate piece of furniture to hold the paint.

In the accompanying drawings,

Figure 1 is a perspective view of my easel;

Figure 2 is a plan view of the trough showing the removable rack, and the material holders;

Figure 3 is a section on the line 3—3 of Fig. 2.

Figure 4 is a section on the line 4—4 of Fig. 2.

Fig. 5 is a perspective view of the rack.

I prefer to construct the easel as shown in Fig. 1, with front legs E and similar back legs E' joined at the top as by the hinge T, in such a manner that the two sets of legs will swing together on closing and lie conveniently flat for stacking. These two sets of legs can also be fastened together somewhere below the top by any suitable means such as an adjustable chain C to determine their spread, which in turn, will fix the angle of a painting board B, which lies upon the legs. The board may be fastened to either set of legs, and may be attached permanently or removably in any convenient manner.

I use the term "board" to designate a painting or drawing board for an easel. This board may be made of any suitable material, but I prefer to make it, or at least its face, of soft wood, composition, or some material adapted to receive thumb tacks. Thumb tacks provide a simple and convenient means by which drawing paper can be attached to the easel board.

In addition to the ease of stacking, another advantage of the construction of easel described above is that a drawing or painting board B, and material trough A can be attached to each of the pairs of legs E and E'.

I mount the trough A on the easel immediately below the board B, close to or touching the board, in order to catch any paint or drippings which may run down from the picture. This is clearly illustrated in Figure 3, which shows in cross section the board B, with the underlying trough A.

By "trough" I refer to the element of my easel which carries the material holders H (Figs. 2 and 3) or J (Fig. 4), and in addition catches the drippings (1) from the holders, and (2) from the artist's brush as it travels from the paint in the holders to the board, and (3) from the picture on the board.

I prefer to make the trough with a lip L projecting behind the face of the board in order to insure the catching of drippings, though a trough whose rear wall is in line with the face of the board may serve. I make the trough removable in order to facilitate its cleansing, and also in order that the easels may be stacked more compactly when not in use. When used with liquid paint the trough should be liquid-tight, and I prefer to make it of some suitable metal which is liquid-tight and easily cleaned.

The trough may be attached to the easel by any suitable means, as by hooks S, or their equivalent, passed through apertures in the rear wall of the trough. For example, if the board is so rigidly fixed to the easel that the trough cannot be slipped onto the hook as shown in Fig. 3, the trough may be attached by means of a screw with a winged nut.

While the trough of my easel is not confined to any particular shape, I have found it convenient to make the trough with an obtuse angle, as shown in Fig. 3, between its floor and its rear wall, which is the same as the obtuse angle formed between the leg of the easel and the floor of the room when the easel is set up in working position with the legs as far apart as permitted by the chain C.

Due to the angle thus formed the rear wall R of the trough will lie flat against the legs E (or E') and can be securely attached to said legs, while at the same time the floor of the trough will be a horizontal surface, suitable for supporting the material holders. Also the top of the rear wall of the trough will form the lip L, to project below and behind the face of the board B and assure catching the drippings from the board.

If the floor of the trough is not made horizontal, however, the material holders need not rest upon it, but may be supported in an erect position by their cooperation with the rack R, for example, as shown at J in Fig. 4.

By "holder" I mean a vessel to contain painting materials, including the paints, pencils, brushes and so forth. I provide the easel with a separate holder for each color of paint to be used and another holder for brushes. As I advocate for children the use of paint in liquid form, I prefer to make the holders liquid-tight; of glass, for example, or of some suitable metal or of material with enameled surface. I may provide covers for the holders in order to prevent evaporation and to keep the materials clean when not in use.

The rack R in my easel, illustrated in perspective in Fig. 5, is an element which I prefer to fit into my trough to keep the material holders in place. I make it removable in order that both rack and trough may be easily cleaned. Any suitable material which is easy to clean may be used, as metal or enameled wood, but I prefer sheet metal.

Another advantage of the rack is that if the means attaching the trough to the legs, are placed within the trough, they will be hidden from view by the rack, and thus eliminate the suggestion to children that the trough is removable. To avoid accidents with the materials, and particularly with liquid paint, it is essential that the trough remain firmly secured to the easel while in use.

In regard to the posture of the child, the painting materials should preferably be located so that the child is not forced to stoop nor encouraged to assume a stooping posture in order to reach the painting materials, and so that the child can easily reach the paint without interrupting his work at the easel.

It is desirable to adjust the easel so that the bottom of the trough is not so low as the child's knee, and the top is not above the child's waist.

To secure this proportion, the easels may be made in various sizes to accommodate different children, or the location of the trough and of the easel board may be made adjustable to the person using the easel, as for example, by providing a series of apertures in the easel to receive means to hold the trough and board firmly thereon at any one of a number of heights.

The bottom of the painting or drawing board preferably rests on the top of the trough, and it is desirable, in the interest of posture, to have the center of the board a little above the child's eye level.

It is understood that my easel may also be used when crayons or other media are employed.

I claim as my invention:

1. An easel comprising a board and a removable liquid tight trough below and in front of the face of said board to carry material holders in front of the board, said trough having a portion extending behind the face of said board to catch drippings from the board, in combination with a removable rack to retain material holders spaced apart in said trough and fitting the trough loosely to permit drippings to fall into the trough, said rack comprising a longitudinal perforated member and integral legs.

2. An easel comprising a board and a removable liquid tight trough below and in front of the face of said board, to carry material holders containing liquid paint in front of the board, said trough having a portion extending behind the face of said board to catch drippings from the board, in combination with a removable rack to retain said material holders spaced apart in said trough, said rack comprising a single longitudinal member perforated to receive the material holders.

In testimony whereof I have signed my name to this specification.

MARGARET E. MATHIAS.